United States Patent
Yoneda

(10) Patent No.: US 8,317,088 B2
(45) Date of Patent: Nov. 27, 2012

(54) INFORMATION KIOSK TERMINAL SYSTEM

(75) Inventor: Yutaka Yoneda, Kahoku (JP)

(73) Assignee: PFU Limited, Ishikawa (JP)

( * ) Notice: Subject to any disclaimer, the term of this patent is extended or adjusted under 35 U.S.C. 154(b) by 366 days.

(21) Appl. No.: 12/424,688

(22) Filed: Apr. 16, 2009

(65) Prior Publication Data

US 2009/0289104 A1    Nov. 26, 2009

(30) Foreign Application Priority Data

May 21, 2008   (JP) ................................ 2008-133547

(51) Int. Cl.
*G06Q 40/00* (2012.01)
*G06Q 20/00* (2012.01)
*G07D 11/00* (2006.01)
*G07F 19/00* (2006.01)
*G06K 5/00* (2006.01)
*G06K 7/00* (2006.01)
*G06F 7/08* (2006.01)

(52) U.S. Cl. ........ 235/379; 235/380; 235/381; 235/435; 705/43; 705/64

(58) Field of Classification Search .......... 235/379–381, 235/435; 705/43, 64
See application file for complete search history.

(56) References Cited

U.S. PATENT DOCUMENTS

| | | | | |
|---|---|---|---|---|
| 4,557,352 A * | 12/1985 | Tschappat, Jr. | ................. | 186/37 |
| 4,603,643 A * | 8/1986 | Couvrette | .................... | 109/24.1 |
| 4,615,280 A * | 10/1986 | Shoop et al. | ................. | 109/24.1 |
| 4,649,832 A * | 3/1987 | Hain et al. | .................... | 109/24.1 |
| 4,735,289 A * | 4/1988 | Kenyon | .......................... | 186/37 |
| 5,304,017 A * | 4/1994 | Vogel et al. | .................... | 406/111 |
| 5,483,047 A * | 1/1996 | Ramachandran et al. | ..... | 235/379 |
| 5,500,514 A * | 3/1996 | Veeneman et al. | ............ | 235/381 |
| 5,780,825 A * | 7/1998 | Sato et al. | ..................... | 235/379 |
| 5,816,174 A * | 10/1998 | Smith et al. | ..................... | 109/56 |
| 6,002,392 A * | 12/1999 | Simon et al. | ................. | 715/702 |
| 6,010,065 A * | 1/2000 | Ramachandran et al. | .... | 235/379 |
| 6,422,158 B1 * | 7/2002 | Fitts et al. | ......................... | 109/2 |
| 6,624,803 B1 * | 9/2003 | Vanderheiden et al. | ...... | 345/156 |
| 7,004,385 B1 * | 2/2006 | Douglass | ...................... | 235/379 |
| 7,100,819 B1 * | 9/2006 | Green et al. | ..................... | 235/379 |
| 7,325,731 B2 * | 2/2008 | Tashiro | .......................... | 235/383 |
| 7,451,918 B2 * | 11/2008 | Vogt | ............................... | 235/379 |
| 7,584,885 B1 * | 9/2009 | Douglass | ...................... | 235/379 |
| 7,661,584 B1 * | 2/2010 | Lute et al. | ..................... | 235/379 |
| 7,735,722 B1 * | 6/2010 | Lute et al. | ..................... | 235/379 |
| 7,775,424 B1 * | 8/2010 | Helzer et al. | .................. | 235/375 |
| 7,780,072 B1 * | 8/2010 | Lute et al. | ..................... | 235/379 |

(Continued)

FOREIGN PATENT DOCUMENTS

JP    11-066252    3/1999

(Continued)

*Primary Examiner* — Daniel Walsh
(74) *Attorney, Agent, or Firm* — Staas & Halsey LLP

(57) ABSTRACT

An information kiosk terminal system includes a pedestal, a transaction unit provided at an upper part of the pedestal and adapted to be pulled out away from the pedestal, and a display unit provided above the transaction unit. The transaction unit includes an upper portion located on the upper side of the transaction unit, and a lower portion located under the upper portion and having a projected portion projecting forward from a front surface thereof. The upper portion is provided inside with a printer unit and is formed at the front surface thereof with a paper discharge port for projecting paper from the printer unit.

6 Claims, 2 Drawing Sheets

U.S. PATENT DOCUMENTS

| | | | |
|---|---|---|---|
| 2003/0120547 A1* | 6/2003 | Walter et al. | 705/16 |
| 2004/0016796 A1* | 1/2004 | Hanna et al. | 235/375 |
| 2004/0016801 A1* | 1/2004 | Newsome et al. | 235/382 |
| 2004/0158499 A1* | 8/2004 | Dev et al. | 705/26 |
| 2005/0062238 A1* | 3/2005 | Broadfield et al. | 280/1 |
| 2005/0137942 A1* | 6/2005 | LaFleur | 705/27 |
| 2005/0156025 A1* | 7/2005 | Utz | 235/379 |
| 2005/0236477 A1* | 10/2005 | Chase | 235/383 |
| 2006/0036753 A1* | 2/2006 | Curtis | 709/229 |
| 2006/0080177 A1* | 4/2006 | Walter et al. | 705/23 |
| 2006/0202014 A1* | 9/2006 | VanKirk et al. | 235/379 |
| 2006/0248806 A1* | 11/2006 | Parsons et al. | 52/36.1 |
| 2007/0228152 A1* | 10/2007 | Washington et al. | 235/379 |
| 2008/0091601 A1* | 4/2008 | Green et al. | 705/43 |
| 2008/0116270 A1* | 5/2008 | Wilson et al. | 235/386 |
| 2009/0032579 A1* | 2/2009 | Gardner | 235/379 |
| 2009/0289105 A1* | 11/2009 | Block et al. | 235/379 |
| 2010/0177157 A1* | 7/2010 | Stephens et al. | 348/14.03 |
| 2011/0297691 A1* | 12/2011 | Freeman | 221/8 |
| 2011/0316828 A1* | 12/2011 | Shirbabadi | 345/207 |
| 2011/0316997 A1* | 12/2011 | Shirbabadi | 348/78 |

FOREIGN PATENT DOCUMENTS

WO    WO 2004044800 A1 *   5/2004

* cited by examiner

INFORMATION KIOSK TERMINAL SYSTEM

BACKGROUND OF THE INVENTION

1. Field of the Invention

The present invention relates to an information kiosk terminal system for providing various information and services.

2. Description of the Related Art

Convenience stores and hospitals, etc., are often equipped with an unmanned information kiosk terminal system for providing various information and services using information stored on a card or the like. As disclosed in Japanese Unexamined Patent Publication No. 11-66252, an information kiosk terminal system includes a monitor for displaying information and further includes, at a transaction unit, various input/output interfaces such as a printer for printing tickets and receipt slips and a magnetic card reader for reading information stored on a magnetic card.

Recently, there is a need for an information kiosk terminal system having the capability of inputting/outputting information using various media, such as a bar code or a noncontact IC card. However, to meet the requirement for processing of information from various media, the information kiosk terminal system is required to be equipped with various input/output interfaces, which in turn requires units for providing various input/output interfaces to be compactly arranged inside of the transaction unit, which often makes it difficult to maintain the transaction unit. Further, when wheelchair users use the information kiosk terminal system, wheelchairs can be obstacles to approaching various input/output interfaces and therefore some measure has to be taken to solve this problem.

SUMMARY OF THE INVENTION

Accordingly, it is an object of the present invention to overcome the aforementioned problem of the prior art and to provide an information kiosk terminal system which is highly maintainable while including various input/output interfaces and can be easily used by wheelchair users.

In order to achieve this object, according to the present invention, there is provided an information kiosk terminal system which includes a pedestal, a transaction unit provided at an upper part of the pedestal and adapted to be able to be pulled out away from the pedestal, and a display unit provided above the transaction unit, wherein the transaction unit includes an upper portion located on the upper side thereof and a lower portion located under the upper portion and having a projected portion projecting forward from a front surface thereof, the upper portion provided inside with a printer unit, the upper portion formed at the front surface thereof with a paper discharge port for discharging paper from the printer unit.

In the information kiosk terminal system according to the present invention, the printer unit is arranged inside the upper portion of the transaction unit adapted to be pulled out forward from the pedestal. Therefore, the paper feeder of the printer unit is easily accessible. Further, a wheelchair can be accommodated in the space under the projected portion of the lower portion of the transaction unit.

In the information kiosk terminal system described above, it is preferable that the upper portion is further provided inside with a magnetic card reader unit and is further formed at the front surface thereof with a card insertion hole for a magnetic card to be inserted into the magnetic card reader unit.

Preferably, the projected portion of the lower portion is provided with at least one of a noncontact IC card unit, a keypad unit, an image scanner unit and a two-dimensional bar code reader unit, and the projected portion is formed at the top surface thereof with a card port surface of the noncontact IC card unit, a keypad of the keypad unit, a scan surface of the image scanner unit or a reading surface of the two-dimensional bar code reader unit.

Further, the key pad of the key pad unit is preferably arranged at the center of the top of the projected portion of the lower portion.

In the information kiosk terminal system according to the present invention, the paper feeder of the printer unit is easily accessible. Generally, paper is frequently changed or refilled. Further, the printer unit includes many mechanically operating parts, such as the paper feed mechanism, which are relatively liable to develop a malfunction. Therefore, the printer unit is required to be frequently accessed, and easy access to the paper feed mechanism of the printer unit can increase maintainability. In addition, a wheelchair can be accommodated in the space under the projected portion of the lower portion of the transaction unit. Therefore, by arranging the input/output interfaces on the upper surface of the projected portion, a wheelchair user can more easily approach any input/output interface.

BRIEF DESCRIPTION OF THE DRAWINGS

The above and other objects, features and advantages of the present invention will be described below in more detail based on preferred embodiments of the present invention with reference to the accompanying drawings, in which.

DETAILED DESCRIPTION OF THE INVENTION

A preferred embodiment of the information kiosk terminal system according to the present invention will be described below with reference to the accompanying drawings.

Figure 1:
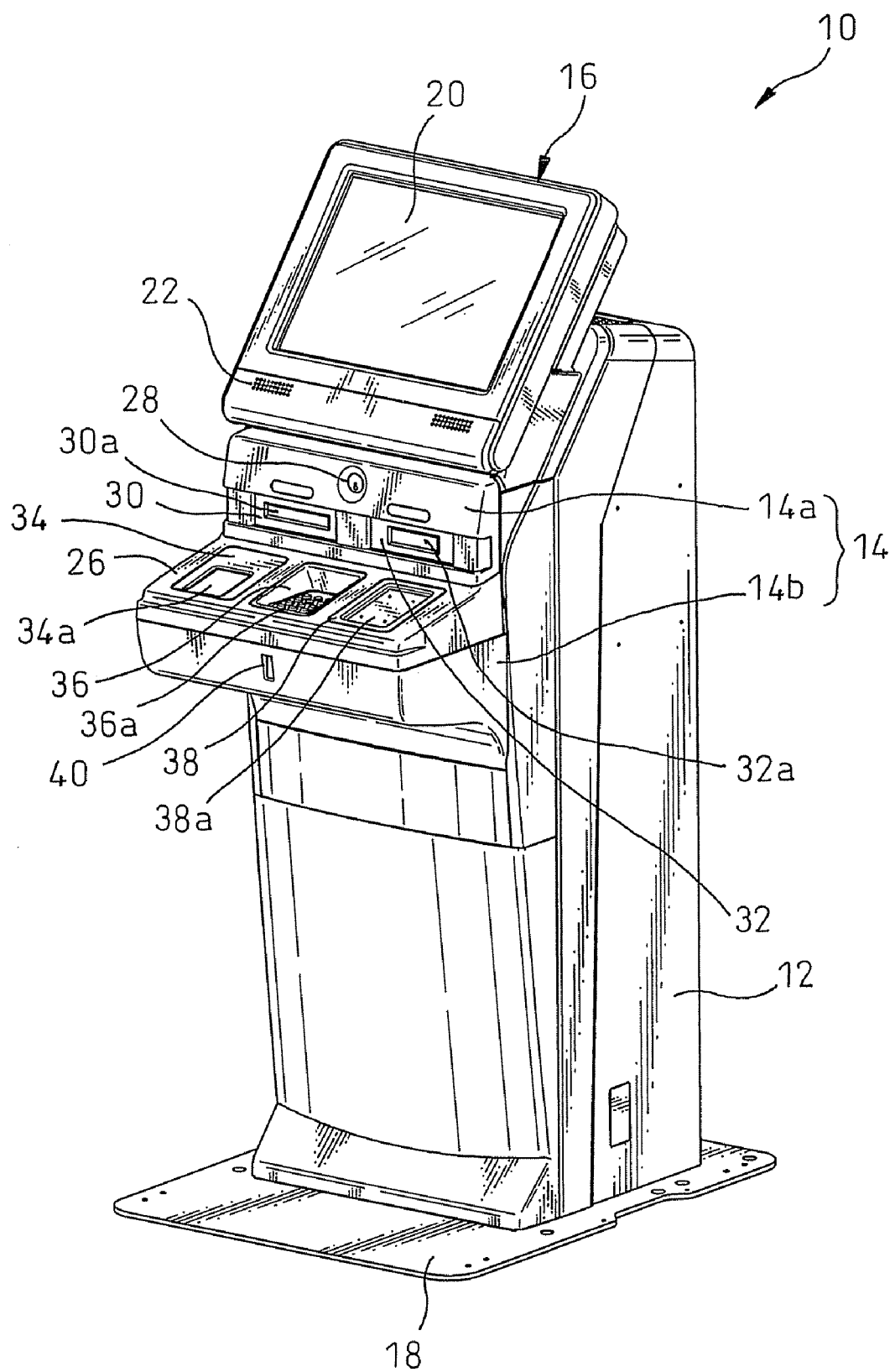
FIG. 1 is a perspective view of an information kiosk terminal system according to the present invention.
Figure 2:
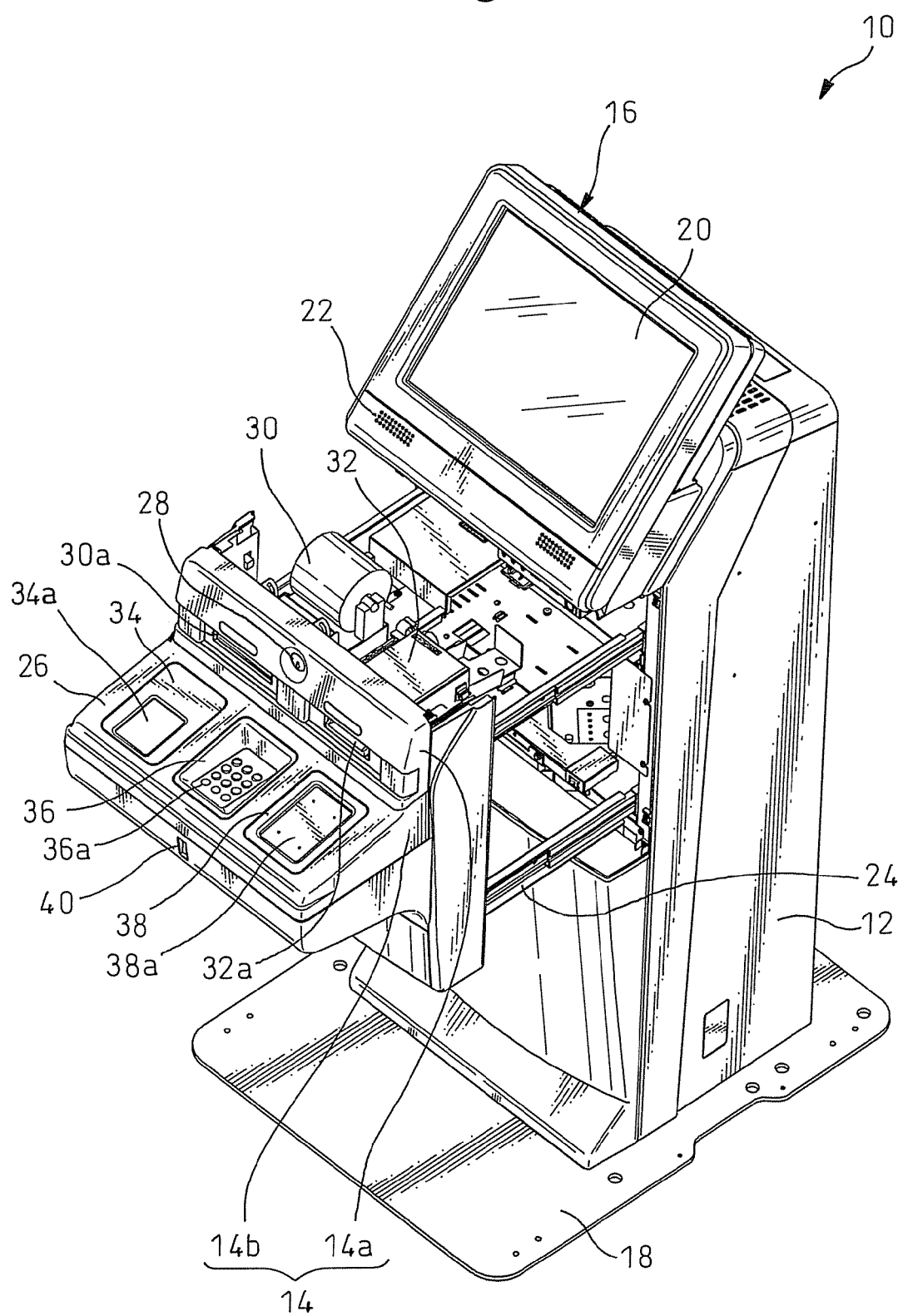
FIG. 2 is a perspective view showing the information kiosk terminal system of FIG. 1 with a transaction unit pulled out forward from a pedestal of the information kiosk terminal system.

Referring to FIGS. 1 and 2, an information kiosk terminal system 10 includes a pedestal 12 installed on a floor surface, a transaction unit 14 provided at the upper part of pedestal 12, and a display unit 16 mounted on pedestal 12 above transaction unit 14. A bottom plate 18 having a larger area than that of an installation surface for pedestal 12 may be attached to the bottom surface of pedestal 12 to secure stability.

Display unit 16 is provided with a touch panel 20, which allows an operator to input information or select instructions by touching a screen of touch panel 20. Touch panel 20 is a commonly-used one and therefore detailed explanation will be omitted. A speaker unit 22 is provided below touch panel 20 to provide an operating sound and a guide voice, etc. Further, display unit 16 is swingably mounted on pedestal 12 so that a tilt of display unit 16 can be adjusted in a front-back direction in accordance with an operator position.

Transaction unit 14 is adapted to be able to be pulled out away from pedestal 12 by means of a slide mechanism and includes an upper portion 14a located on the upper side of transaction unit 14 and a lower portion 14b located under upper portion 14a. Lower portion 14b includes a projected portion 26 projecting forward from the front surface thereof so as to form a space below projected portion 26 in front of pedestal 12. It should be noted that a lock mechanism 28 is provided on upper portion 14a of transaction unit 14 to make it possible to lock transaction unit 14 in a position where it is retreated into pedestal 12.

In the shown embodiment, upper portion 14a of transaction unit 14 is provided with a printer unit 30 for printing on a paper and a magnetic card reader unit 32 for reading off a magnetic card. The front surface of upper portion 14a is formed with, starting from the left in FIGS. 1 and 2, a paper discharge port 30a for discharging paper from printer unit 30 and a card insertion port 32a for inserting a card therethrough into magnetic card reader unit 32. On the other hand, in the shown embodiment, projected portion 26 of lower portion 14b of transaction unit 14 is provided inside with an noncontact IC card unit 34 for reading information stored in the noncontact IC card and writing information on the noncontact IC card by communication, and input/output interface units such as a keypad unit 36 for inputting a personal identification number or other numerical characters, and an image scanner unit 38 for reading a two-dimensional bar code and information displayed on the nonmagnetic card, and the top surface of projected portion 26 is formed with, starting from left in FIGS. 1 and 2, a card port surface 34a of noncontact IC card unit 34, a keypad 36a of keypad unit 36 and a scan surface 38a of image scanner unit 38. Further, a presence sensor 40 is provided on the front surface of projected portion 26 of lower portion 14b of transaction unit 14.

The provision of presence sensor 40 enables information to be presented on display unit 16 or input/output interface units to be turned on only when an operator approaches, thereby suppressing the energy consumption.

In maintenance for upper portion 14a of transaction unit 14, as shown in FIG. 2, transaction unit 14 is pulled out away from information kiosk terminal system 10 in the state shown in FIG. 1. Printer unit 30 is arranged behind paper discharge port 30a of upper portion 14a of transaction unit 14, and a paper feeder is provided on the back of printer unit 30. Magnetic card unit 32 is also arranged behind card insertion hole 32a of upper portion 14a of transaction unit 14. In printer unit 30, paper is consumed and therefore refilled frequently. However, in view of the fact that printer unit 30 (specifically, the paper feeder thereof) is located at the upper part of transaction unit 14, no obstacle exists above printer unit 30 when transaction unit 14 is pulled out, and therefore, paper can be refilled easily. Also, the paper feed mechanism of printer unit 30 and the card feed mechanism of magnetic card reader unit 32 are relatively liable to develop a malfunction due to the presence of the mechanically operating parts for discharging paper and loading/unloading the magnetic card. However, since these parts liable to develop a malfunction are arranged on the upper portion 14a of transaction unit 14, the parts are easily repaired or changed in case of a malfunction.

On the other hand, when performing maintenance for noncontact IC card unit 34, keypad unit 36 and image scanner unit 38 arranged on projected portion 26 of lower portion 14b of transaction unit 14, a top cover mounted on the top of projected portion 26 can be removed.

In information kiosk terminal system 10 according to the present invention, projected portion 26 of lower portion 14b of transaction unit 14 includes noncontact IC card unit 34, keypad unit 36 and image scanner unit 38, etc. Therefore, these units are not required to be arranged in the part of transaction unit 14 accommodated in pedestal 12 (hereinafter referred to also as transaction unit body), and it is thus possible to avoid the concentrated arrangement of various units in the transaction unit body. Further, since card port surface 34a of noncontact IC card unit 34 and scanner surface 38a of image scanner unit 38 is arranged on the top surface of projected portion 26, card port surface 34a and scan surface 38 can be arranged in a substantially horizontal position so as to be convenient for mounting the magnetic card and the printed matter. In addition, by arranging keypad unit 36 at the center of the top of projected portion 26 as in this embodiment, keypad 36a can be hidden naturally behind the operator when operating it in front of information kiosk terminal system 10. As a result, this arrangement of keypad unit 36 is desirable for security reasons.

In information kiosk terminal system 10 according to the present invention, projected portion 26 is projected from the front surface of pedestal 12 to form a space under projected portion 26. Therefore, when a wheelchair user operates information kiosk terminal system 10, the wheelchair can be accommodated in the space under projected portion 26 to access the input/output interfaces provided on the top surface of projected portion 26. Since the input/output interfaces provided on upper portion 14a of transaction unit 14 is relatively far from the operator, it is preferable to arrange, on upper portion 14a of transaction unit 14, printer unit 30 discharging paper, magnetic card reader unit 32 for the card to be inserted therein or taken out thereof, or other input/output interfaces allowing the relatively far distance to be covered by the length of the paper or card.

Although the present invention has been described above with reference to the embodiments shown in the drawings, it is not limited to these embodiments. For example, projected portion 26 may be provided with a bar code reader unit in place of or in addition to image scanner unit 38, and the top surface of projected portion 26 may be formed with the bar code reading surface.

What is claimed is:

1. An information kiosk terminal system comprising a pedestal, a transaction unit provided at an upper part of the pedestal and adapted to be able to be pulled out forward from the pedestal, and a display unit provided above the transaction unit, wherein said transaction unit includes an upper portion located on an upper side of the transaction unit and a lower portion located under the upper portion and having a projected portion projecting away from a front surface of the pedestal, said upper portion provided inside with a printer unit, said upper portion formed at the front surface thereof with a paper discharge port for discharging paper from said printer unit;

wherein said projected portion of said lower portion is provided with noncontact IC card unit, a keypad unit, and one of an image scanner unit and a two-dimensional bar code reader unit, and said projected portion is formed at a top surface of the lower portion with a card port surface of said noncontact IC card unit, a keypad of said key pad unit, and one of a scan surface of said image scanner unit and a reading surface of said two-dimensional bar code reader unit so as to arrange them in a substantially horizontal position.

2. The information kiosk terminal system according to claim 1, wherein said upper portion is further provided inside with a magnetic card reader unit, and is further formed at the front surface thereof with a card insertion hole for a magnetic card to be inserted into said card reader unit.

3. The information kiosk terminal system according to claim 2, wherein said projected portion of said lower portion is provided with at least one of a noncontact IC card unit, a keypad unit, an image scanner unit and a two-dimensional bar code reader unit, and said projected portion is formed at the top surface thereof with a card port surface of said noncontact IC card unit, a keypad of said key pad unit, a scan surface of said image scanner unit or a reading surface of said two-dimensional bar code reader unit.

4. The information kiosk terminal system according claim 3, wherein said keypad of said keypad unit is arranged at the center of the top of said projected portion of a lower side portion.

5. The information kiosk terminal system according to claim 1, wherein said keypad of said keypad unit is arranged at the center of the top of said projected portion of said lower portion.

6. The information kiosk terminal system according to claim 1, wherein said projected portion projects from the front surface of the pedestal enough to accommodate a wheelchair in a space under the projected portion.

* * * * *

UNITED STATES PATENT AND TRADEMARK OFFICE
CERTIFICATE OF CORRECTION

PATENT NO. : 8,317,088 B2
APPLICATION NO. : 12/424688
DATED : November 27, 2012
INVENTOR(S) : Yutaka Yoneda It is certified that error appears in the above-identified patent and that said Letters Patent is hereby corrected as shown below:

Column 4, Line 47, In Claim 1, before "noncontact" insert -- a --.
Column 4, Line 52, In Claim 1, delete "key pad" and insert -- keypad --.
Column 4, Line 67, In Claim 3, delete "key pad" and insert -- keypad --.
Column 5, Line 3, In Claim 4, delete "according" and insert -- according to --.

Signed and Sealed this
Twelfth Day of March, 2013

Teresa Stanek Rea
*Acting Director of the United States Patent and Trademark Office*